US010786709B2

(12) United States Patent
Kessler et al.

(10) Patent No.: US 10,786,709 B2
(45) Date of Patent: Sep. 29, 2020

(54) LAMP GLOBE WITH A TACTILE SURFACE

(71) Applicant: Kessler Corporation, Los Angeles, CA (US)

(72) Inventors: Alexander Kessler, Los Angeles, CA (US); Brian Kessler, Los Angeles, CA (US)

(73) Assignee: KESSLER CORPORATION, Los Angeles, CA (US)

( * ) Notice: Subject to any disclaimer, the term of this patent is extended or adjusted under 35 U.S.C. 154(b) by 116 days.

(21) Appl. No.: 15/982,513

(22) Filed: May 17, 2018

(65) Prior Publication Data

US 2018/0333614 A1  Nov. 22, 2018

Related U.S. Application Data

(63) Continuation-in-part of application No. 15/598,658, filed on May 18, 2017, now Pat. No. 10,369,421.

(51) Int. Cl.
*F21L 4/00* (2006.01)
*A63B 37/12* (2006.01)
(Continued)

(52) U.S. Cl.
CPC .............. *A63B 37/12* (2013.01); *A63B 39/06* (2013.01); *A63B 41/08* (2013.01); *A63B 43/002* (2013.01);
(Continued)

(58) Field of Classification Search
CPC ......... A63B 37/12; A63B 45/00; A63B 41/08; A63B 43/06; A63B 43/002; A63B 43/008;
(Continued)

(56) References Cited

U.S. PATENT DOCUMENTS

| 563,170 A | 6/1896 | Haley |
| 1,185,432 A | 5/1916 | Petersen |

(Continued)

FOREIGN PATENT DOCUMENTS

| CN | 302405235 | 4/2013 |
| CN | 302727470 | 1/2014 |

(Continued)

OTHER PUBLICATIONS

Spikey Ball, 3" D., https://web.archive.org/web/20151210193028/http://www.jefferspet.com:80/products/spikey-cat-toy-w-bell?via=533884849fa2600f000000f0%2F533884859fa2600f00000104%2F533884879fa2600f00000128>, fig. 2, retrieved on Sep. 25, 2018.

(Continued)

*Primary Examiner* — Ali Alavi
(74) *Attorney, Agent, or Firm* — Browdy and Neimark, P.L.L.C.

(57) ABSTRACT

An object with a tactile outer layer includes, for example, a ball having an outer surface and a series of protrusions or spikes on the outer surface. The protrusion each appear as a tear-dropped shape mass that includes a base having a relatively flat bottom adhered to the outer surface of the ball and a narrow tip and/or curved tail extending away from the outer surface.
Manufacturing can be performed by mounting the object and utilizing injection arms that deposit elastomer globules on the object. The globules are deposited by pressure through a reservoir in the injection arm and the injection arms are then withdrawn to product the tail shape.

9 Claims, 12 Drawing Sheets

(51) Int. Cl.

| | | |
|---|---|---|
| *A63B 43/06* | (2006.01) | |
| *A63B 39/06* | (2006.01) | |
| *B29D 22/04* | (2006.01) | |
| *B29D 22/02* | (2006.01) | |
| *A63B 45/00* | (2006.01) | |
| *A63B 41/08* | (2006.01) | |
| *A63B 43/00* | (2006.01) | |
| *B29D 99/00* | (2010.01) | |
| *A63B 71/06* | (2006.01) | |
| *A63B 37/06* | (2006.01) | |
| *A63B 37/14* | (2006.01) | |
| *A63B 37/04* | (2006.01) | |

(52) U.S. Cl.
CPC .............. *A63B 43/06* (2013.01); *A63B 45/00* (2013.01); *B29D 22/02* (2013.01); *B29D 22/04* (2013.01); *A63B 37/04* (2013.01); *A63B 37/14* (2013.01); *A63B 43/008* (2013.01); *A63B 2037/065* (2013.01); *A63B 2071/0655* (2013.01); *A63B 2209/14* (2013.01); *B29D 99/0042* (2013.01)

(58) Field of Classification Search
CPC ..... A63B 39/06; A63B 2209/14; A63B 37/14; A63B 37/04
See application file for complete search history.

(56) References Cited

U.S. PATENT DOCUMENTS

| | | |
|---|---|---|
| D52,500 S | 9/1918 | Vaile |
| D179,035 S | 10/1956 | Roth |
| 3,580,575 A | 5/1971 | Speeth |
| 4,368,684 A | 1/1983 | Launay |
| 4,522,396 A | 6/1985 | Girard et al. |
| 4,756,529 A | 7/1988 | Stillinger |
| D301,161 S | 5/1989 | Dunse |
| 4,836,552 A | 6/1989 | Puckett et al. |
| 4,962,926 A | 10/1990 | Chen |
| 4,991,841 A | 2/1991 | Paranto |
| 5,028,053 A | 7/1991 | Leopold |
| 5,054,778 A | 10/1991 | Maleyko |
| 5,131,565 A | 7/1992 | Myers |
| 5,228,686 A | 7/1993 | Maleyko |
| 5,433,438 A | 7/1995 | Gilman |
| 5,639,076 A | 6/1997 | Cmiel |
| 5,725,445 A | 3/1998 | Kennedy |
| D393,671 S | 4/1998 | Honaker |
| D396,904 S | 8/1998 | Leu |
| D401,365 S | 11/1998 | Liu |
| D406,545 S | 3/1999 | Deginther |
| D441,815 S | 5/2001 | Murphy |
| D462,131 S | 8/2002 | Huang et al. |
| 6,485,378 B1 | 11/2002 | Boehm |
| 6,527,616 B1 | 3/2003 | Li |
| 6,575,855 B1 | 6/2003 | Buzak |
| 6,645,101 B1 | 11/2003 | Wong |
| 7,014,581 B2 | 3/2006 | Ng |
| D535,341 S | 1/2007 | Chernick et al. |
| D536,754 S | 2/2007 | Chernick et al. |
| D537,131 S | 2/2007 | Chernick et al. |
| D540,896 S | 4/2007 | Chernick et al. |
| D551,307 S | 9/2007 | Chernick et al. |
| D561,277 S | 2/2008 | Chernick et al. |
| D568,424 S | 5/2008 | Nelson et al. |
| 7,413,524 B1 | 8/2008 | Bibby |
| D581,765 S | 12/2008 | Lane |
| D583,421 S | 12/2008 | Slinker |
| 7,517,324 B2 | 4/2009 | Cohen |
| D626,610 S | 11/2010 | Grimm |
| D637,667 S | 5/2011 | Lin et al. |
| D650,874 S | 12/2011 | Williams |
| D657,011 S | 4/2012 | Lederman et al. |
| D667,515 S | 9/2012 | Wang |
| D672,398 S | 12/2012 | Kondou et al. |
| 8,579,741 B2 | 11/2013 | Heland |
| D695,371 S | 12/2013 | Hedeen, Jr. |
| D698,878 S | 2/2014 | Zhang et al. |
| 8,727,919 B1 | 5/2014 | Gentile |
| D706,883 S | 6/2014 | Hedeen, Jr. |
| D738,964 S | 9/2015 | Reynolds |
| D817,562 S | 5/2018 | Markham |
| 2006/0146525 A1 | 7/2006 | Chernick |
| 2007/0270233 A1 | 11/2007 | Ruston |
| 2009/0209374 A1 | 8/2009 | Ou |
| 2011/0265374 A1 | 11/2011 | Tompkins, IV |
| 2014/0272850 A1 | 9/2014 | Knight |
| 2015/0005683 A1 | 1/2015 | Balducci |
| 2015/0083052 A1 | 3/2015 | Glaser |
| 2015/0090193 A1 | 4/2015 | Giarrizzo |
| 2015/0165277 A1 | 6/2015 | Ono et al. |
| 2015/0256126 A1 | 10/2015 | Soofer |
| 2017/0051888 A1* | 2/2017 | Kehrmann ............ F21S 10/002 |

FOREIGN PATENT DOCUMENTS

| | | |
|---|---|---|
| CN | 304468013 | 1/2018 |
| EP | 3 025 767 | 6/2016 |
| FR | 2 585 255 | 1/1987 |
| GB | 509475 A | 7/1939 |
| WO | 2014/191294 | 12/2014 |

OTHER PUBLICATIONS

Great Bur Reed (*Sparganium eurycarpum*) shown on webpage :http://www.agrecol.com/zoomify.asp?catalogid=225&img=assets/images/store%20images/spaeur%206001.jpg [Accessed Jul. 26, 2018] (Year: 2018).

Durian fruit shown on webpage: https:I/i.pinimg .com/736x10c/6a/a6/0c6aa694d91 fdc6e29f84cbd031 d2ed5--extreme-food-exotic-foj.odpg[Accessed Jul. 26, 2018] (Year: 2018).

Pollen Grains shown on webpage: https:I/c8.alamy.com/comp/AXJ2AJ/pollen-grain-AXJ2AJ.jpg [Accessed Jul. 26, 2018] (Year: 2018).

Sensory Tactile Hairy LED Light Up Smiley Ball; shown on webpage: https://www.sensorytoywarehouse.com/mini-smile-sizzler-electromites [Accessed Sep. 11, 2018] (Year: 2018).

Flashing Ball—Spiky Light Up Firm Rubber Sensory Gadget shown on webpage: https://www.sensorytoywarehouse.com/flashing-spikey-light-up-ball [Accessed Sep. 11, 2018] (Year: 2018).

Large Sensory Tactile Squishy Hairy String Ball shown on webpage: https://www.sensorytoywarehouse.com/ball-furb-puffer [Accessed Sep. 11, 2018] (Year: 2018).

4 Pack of Rainbow UV Spine Balls shown on webpage: https://www.cheapdisabilityaids.co.uk/4-pack-of-rainbow-uv-spine-balls-39911-p.asp [Accessed Sep. 10, 2018] (Year: 2018).

Bobbling Textured Ball shown on webpage: https://www.cheapdisabilityaids.co.uk/bobbling-textured-ball-2138-p.asp [Accessed Sep. 11, 2018] (Year: 2018).

Rubber Spine Balls Rubber Spine Balls—Super Bouncy Sensory UV Tools (Set of 4) shown on webpage: https://www.sensorytoywarehouse.com/super-bounce-uv-spine-ball [Accessed Sep. 14, 2018] (Year: 2018).

Flashing Sensory Ball—Rainbow shown on webpage: https://www.sensorytoywarehouse.com/flashing_bobble_ball [Accessed Sep. 11, 2018] (Year: 2018).

Spiky Light Up Ball shown on webpage: https://www.sensorytoywarehouse.com/SMALL-6.5cm-Spiky-textured-Light-Up-Bal[Accessed Sep. 11, 2018] (Year: 2018).

Spiky Massage Ball shown on webpage:https://www.sensorytoywarehouse.com/100mm-porcupine-tactile-massage-ball [Accessed Sep. 11, 2018] (Year: 2018).

UV Sensory Tactile Knitted Ball Rubber Toy shown on webpage: https://www.sensorytoywarehouse.com/uv-knitted-ball [Accessed Sep. 11, 2018] (Year: 2018).

Wholesale 5OPCS Body Piercing Spiked Koosh Ball Tongue Rings shown on webpage: https://www.aliexpress.com/item/Wholesale- (56) References Cited

OTHER PUBLICATIONS

50pcs-Body-Piercing-Spiked-Koosh-Ball-Tongue-Rings-New/517310512.html [Accessed Sep. 14, 2018] (Year: 2018).
A confidential (non-public) offer for sale of a product or prototype within the scope of one or more of the claims occurred on Mar. 15, 2017.

* cited by examiner

LAMP GLOBE WITH A TACTILE SURFACE

CROSS REFERENCE TO RELATED APPLICATIONS

This application is a continuation-in-part of and claims priority to U.S. patent application Ser. No. 15/598,658 filed on May 18, 2017, which is incorporated by reference herein in its entirety.

TECHNICAL FIELD

The technology relates to balls and other objects having an uneven surface or uneven outer layer, more particularly, balls having a non-smooth, tactile surface.

BACKGROUND

Ball games are a popular form of play. Most conventional balls follow specific and standardized guidelines with traditional designs. The present invention proposes a novel design of a ball and other objects with a tactile layer or irregular outer surface to enhance the pleasure of using, playing or displaying the object.

SUMMARY OF INVENTION

In one general aspect, an article with a tactile surface or tactile outer layer, may be an inflatable ball or other object having an outer surface and a series of protrusions or spike-shaped deposits on the outer surface. Embodiments may include one or more of the following features. For example, the series of protrusions may include a tear-dropped shape mass or globule that includes a base having a relatively flat bottom adhered to the outer surface of the ball and a narrow tip extending away from the outer surface. The narrow tip may be straight relative to a central axis of the ball or it may have a curve such that it appears more as a tail-like shape.

The base of each tear-dropped shaped mass may be in contact with the base of each adjacent tear-dropped shaped mass or globule to completely cover the outer surface. This can provide additional structural integrity where the base is bonded to the base of each surrounding globule. Alternatively, the base of each tear-dropped shaped mass may be a discrete distance from the base of each adjacent tear-dropped shaped mass thereby exposing portions of the outer surface of the ball. In another embodiment, the elastomer globules are adhered to each other without the need to be adhered to an underlying surface.

Each tear-dropped shaped mass deposited on the outer surface may be a polymer with elastic properties (elastomer), such as, for example, rubber, silicon rubber, polyisoprene or polybutadiene, polyisobutylene, etc. The ball may be made from thermoplastic polyurethane, thermoplastic rubber or polyvinyl chloride or other suitable materials.

The series of protrusions may appear as a layer of spikes or furry globules covering the outer surface. The spikes may have different colors configured as a pattern or design.

The ball may be inflatable and can have a fill valve. As another feature, there may be an illumination device inside the inflatable ball. The ball may also be composed of a solid core, or an open or closed cell foam core. The inflatable ball may be spherical, a spheroid or any other suitable shape, such as, for example, an American style football.

In another general aspect, the ball with tactile outer layer may include a first layer that includes a hollow sphere having a smooth outer surface and a second layer of more than one globule deposited or dropped onto the outer surface of the sphere. Each globule may appear as a tear-drop shaped mass having a relatively flat base and a narrow tip, the base of each tear-drop shaped mass adheres to the smooth outer surface with the narrow tip extending away from the outer surface.

Embodiments may include one or more of the above or following features. For example, the second layer may be a continuous layer completely covering the first layer thereby adding additional structural integrity. There may also be a lighting device inside the first layer.

In still another embodiment, the article may be a spiked globe used as a decorative lamp, that includes a translucent or transparent sphere having a relatively smooth outer surface and more than one tear-drop shaped spike attached to the outer surface, each spike having a relatively flat base and a narrow tip extending away from the outer surface, an illumination device or light source inside the sphere and an electrical lighting circuit having a power source and a switch, the lighting circuit being electrically connected to the light source to turn it on and off.

Embodiments may include one or more of the above or following features. For example, a base can be attached to the sphere. In addition, the lighting circuit may be enclosed within the base.

In another general aspect, a method of manufacturing an object having a tactile outer layer or irregular outer surface layer, includes mounting the object in a mounting device and applying elastomer globules to a surface of the object, wherein the globule includes round drops attached to the surface of the object.

Embodiments may include one or more of the above or following features. For example, applying the elastomer globules further may include applying more than one series of the elastomer globules on the surface of the object. A first series of the elastomer globules may be simultaneously applied, the object may then be rotated and then a second and following series of elastomer globules is applied after reach rotation. When the object is circular or spherical, the simultaneous application may be applied in a circle, such as a great circle, or in an arc around the surface of the object.

In still another general aspect, a method of manufacturing an object having a tactile outer layer includes mounting the object in a mounting device, positioning a series of applicators proximate to a surface of the object, ejecting elastomer globules from the applicators onto the surface of the object, withdrawing the applicators from the surface to produce a tail-like shape at an end of the elastomer globule furthest from the surface of the object, rotating the object in the mounting device, and repeating the ejection of the elastomer globules until the surface of the object is covered with the elastomer globules. Embodiments may include one or more of the above or following features.

In yet another general aspect, a system to manufacture objects having a tactile surface include a mounting device to receive an object and more than one injection arm in an arc surrounding the object. Each injection arm moves from a proximate position nearest the object and a distal position farthest from the object, and each injection arm deposits an elastomer globule on the object in the proximate position and then moves toward the distal position to produce a tail-like shape at an end of the elastomer globule farthest from the object. This can provide a soft, "furry" appearance to the object.

Embodiments may include one or more of the above or following features. For example, the injection arm may have a reservoir that contains elastomer, a nozzle at an end of the injection arm, and a pressure system that pushes the elastomer globule out of the nozzle and onto the object.

As another feature, the mounting device includes a rotation assembly to rotate the object on a central axis. It may also have a rotation motor to rotate the rotation assembly or a rotation knob to manually turn the rotation assembly.

In another general aspect, a system to manufacture an object with a tactile layer includes an injection mold that receives a plasticized material and more than one injection surrounding the injection mold. Each injection arm moves from a proximate position nearest the injection mold and a distal position farthest from the injection mold and each injection arm deposits the elastomer globule on the plasticized material in the proximate position and then moves toward the distal position to produce a tail-like shape from the elastomer globule at a position farthest from the plasticized material. Embodiments may include one or more of the above features.

BRIEF DESCRIPTION OF THE DRAWINGS

The following drawings show some of the exemplary embodiments of the present invention.

DETAILED DESCRIPTION

Figure 1:
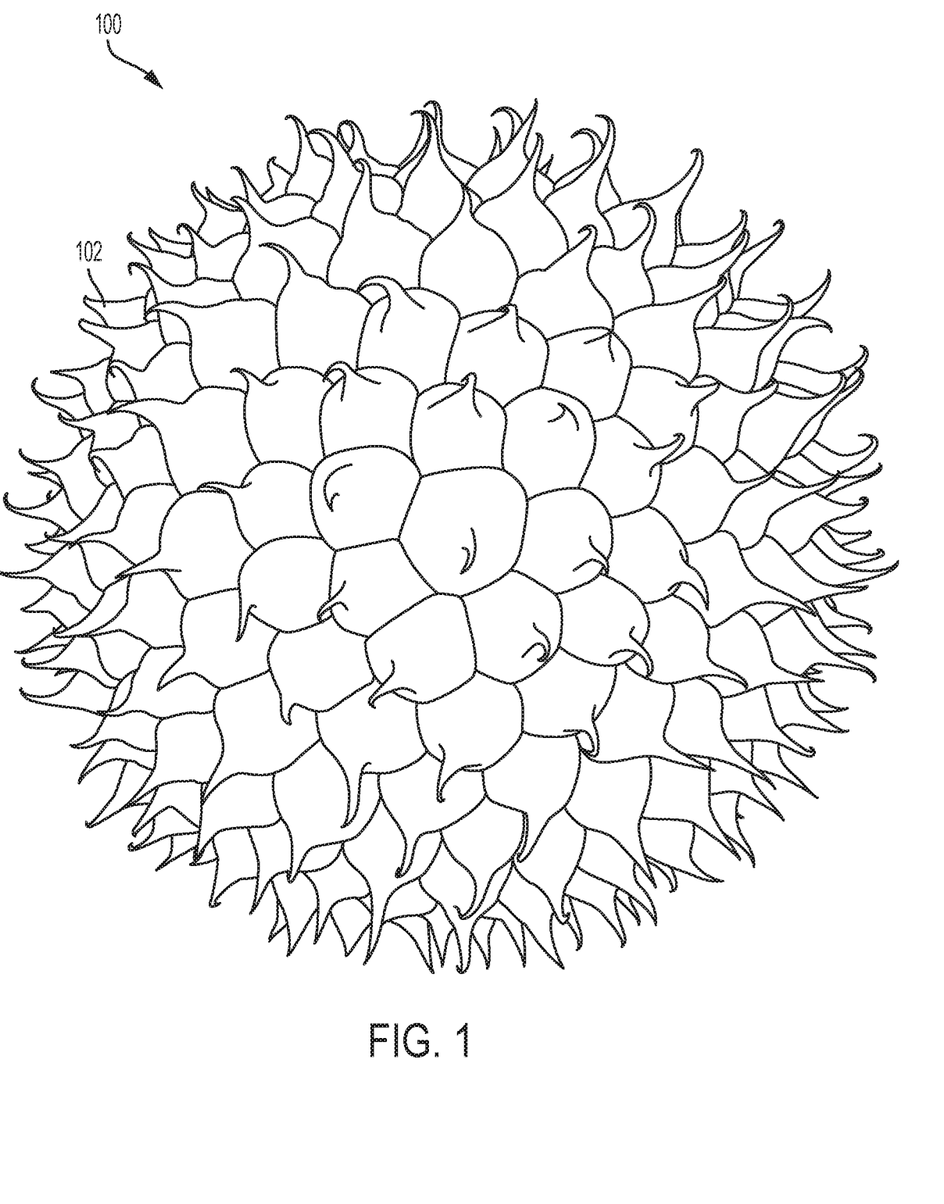
FIG. 1 shows a ball with tactile outer layer according to the present invention.
Figure 2:
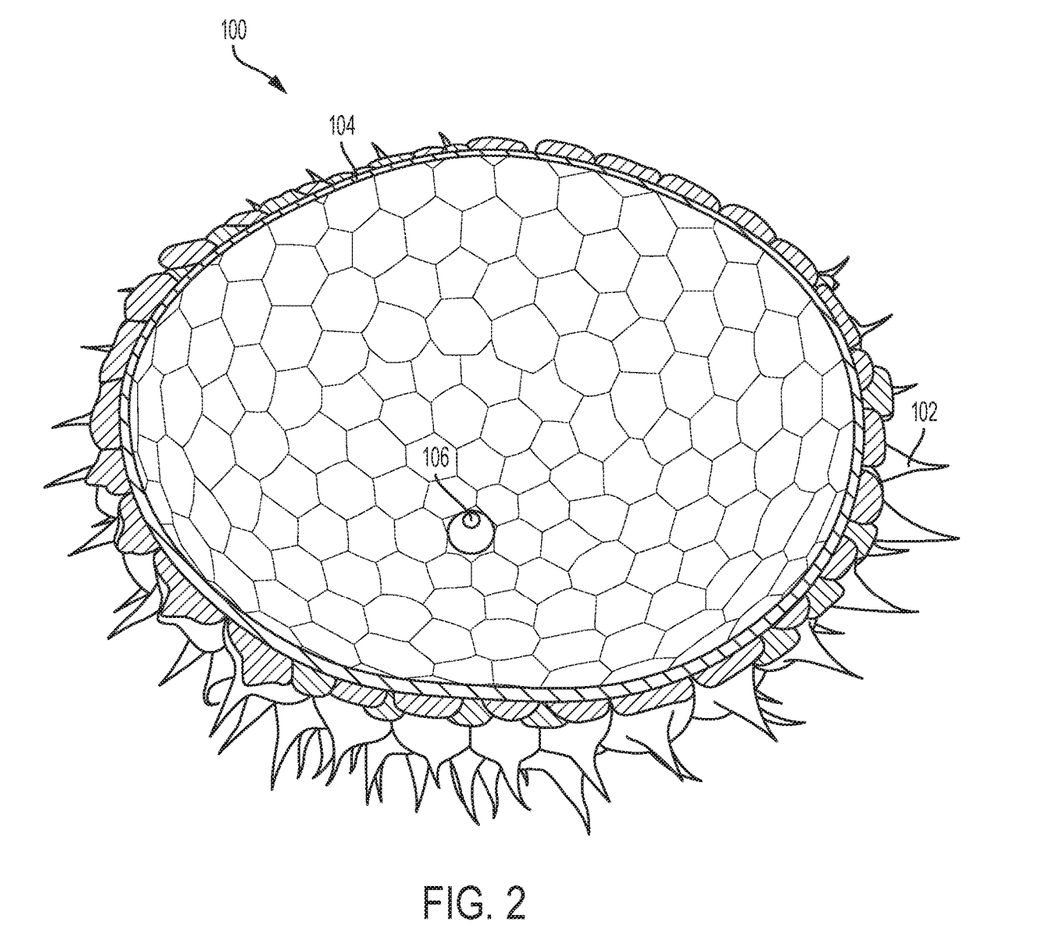
FIG. 2 shows a cross-section perspective view of the ball in FIG. 1.

Referring to FIGS. 1-2, a ball with tactile outer layer, referred to as a spiked ball 100, includes a series of spikes 102 covering an inner pressurized ball 104. As used herein, the term tactile outer layer refers more generally to a non-smooth or irregular surface that can provide a unique sense of feel when touched. Hundreds of spikes 102 made of silicon rubber or other elastomers are positioned on the inner ball 104 which is made of plastic or other rubber hybrids, such as, for example, thermoplastic polyurethane, thermoplastic rubber or polyvinyl chloride or other suitable materials. The result is a play ball 100 that does not have a heavy, dangerous hard core and creates a ball 100 that can be used in unique ways that no other ball can do.

The spikes 102 can be made of a soft elastomer such with a high degree of elasticity.

This elasticity of the protruding spikes 102 gives the ball 100 a unique tactile feel and provides a surface for gripping that is different than any other ball. The protruding spikes 102 cause the ball 100 to contact or "grab" the ground to create a unique bounce. The spikes 102 may be straight or curved relative to a central axis of the ball 100.

The inner pressurized ball 104 can be made of any inflatable ball structure but typically would not be a balloon or other material that could puncture easily. The inner ball 104 should maintain its own integral structure and pressure to be a product that maintains durability and long life. However, in other embodiments the spikes 102 are a complete layer that provides additional structural integrity, and in some embodiments, without the need for an inner ball.

FIG. 2 is a cut-away or cross section of the ball 100. A fill valve 106 is used to pressurize the ball 100. The ball 104 is made of a transparent material. Thus, the bottom or base 110 of the spikes 102 are visible from the inside of the ball 104. The spikes may be viscous, fluid-like globules when deposited on the ball. Thus, depending on the proximity and pattern of application of the spikes on the ball, the bottom of the spikes can take on random non-circular shapes as the globules settle onto the surface of the ball 104.

Figure 3:
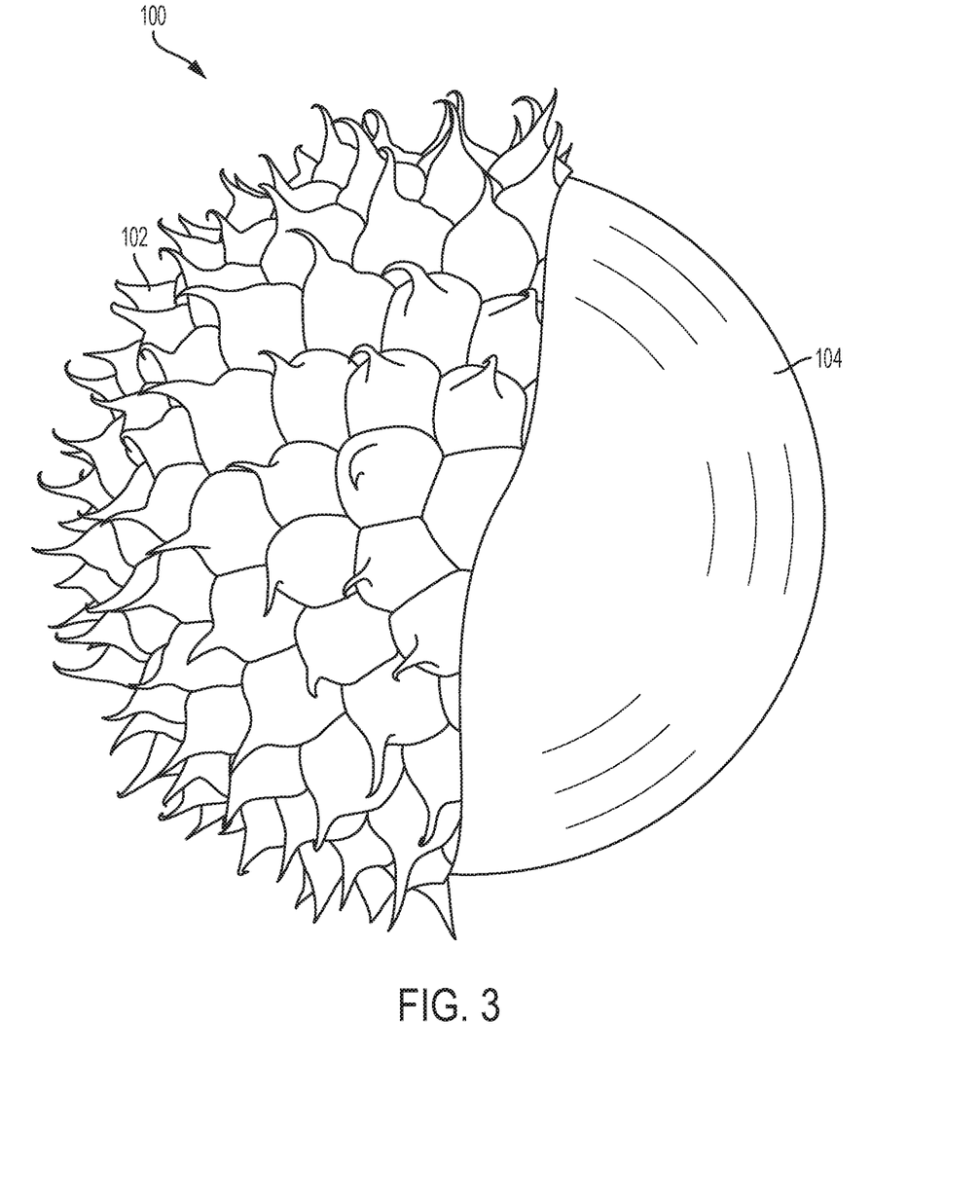
FIG. 3 shows layers of the ball of FIG. 1.
Figure 4:
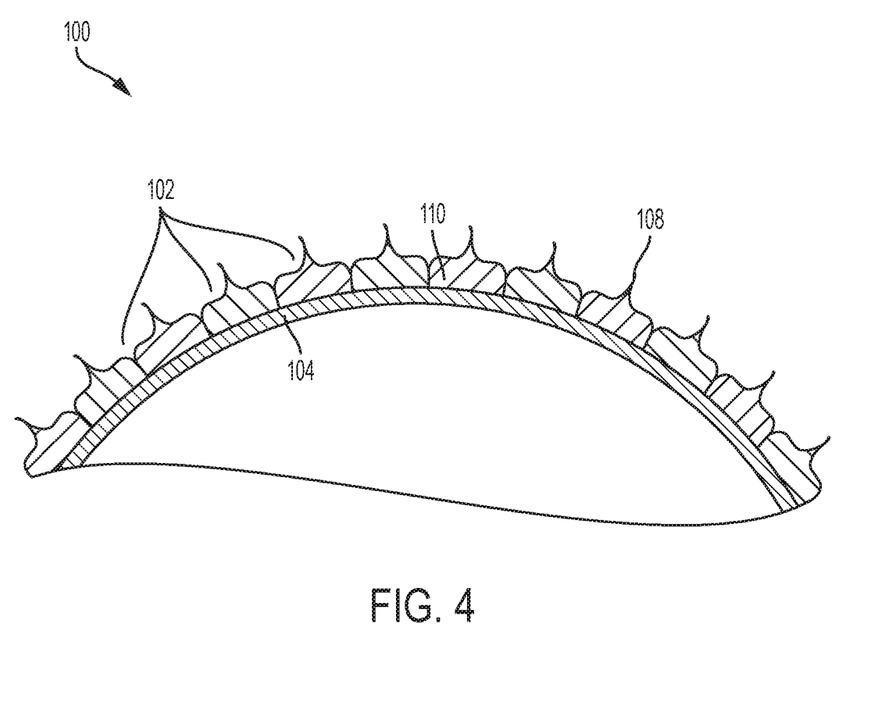
FIG. 4 shows a portion of a cross-section of the ball in FIG. 1.

FIGS. 3 and 4 show an embodiment where the spikes are applied in a continuous layer to essentially cover the surface of the inner ball 104. As shown in the more detailed view of FIG. 4, the spikes 102 may have a tear-dropped shape with a flat bottom or base 110 adhered to the inner ball 104 and a tail or tip 108 extending away from the center of the spiked ball 100. The base 110 of each tear-dropped mass or spike 102 is in contact with and essentially bonded to the base 110 of each adjacent spike. Thus, the inner ball 104 may not be visible and the continuous bonding of adjacent spikes may add some additional structural integrity.

Figure 5:
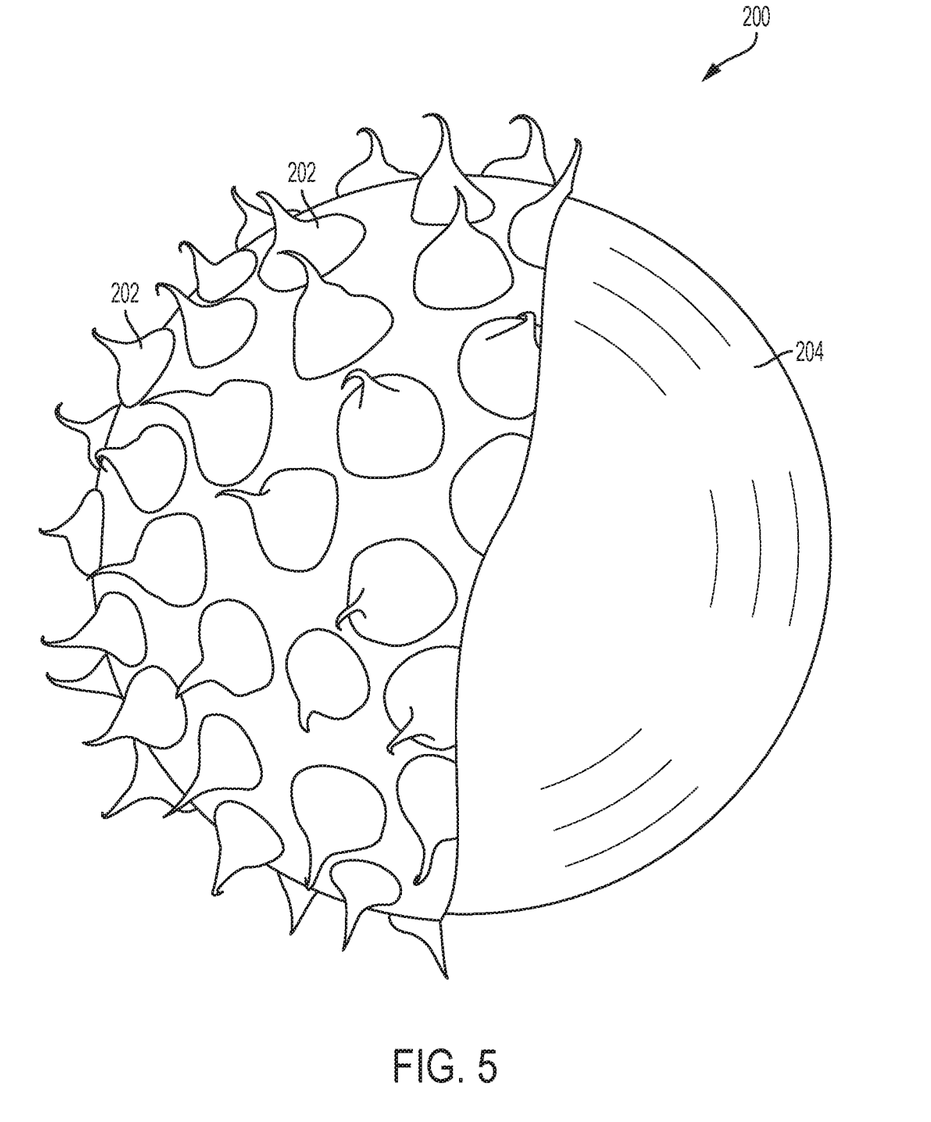
FIG. 5 shows a second embodiment of the ball with tactile outer layer according to the present invention.

FIG. 5 shows a second embodiment of the ball 200 where a discrete distance is maintained between each spike 202 on an inner pressurized ball 204. Thus, the surface of the ball 204 is visible between the spikes. As shown, the tail of each spike 202 may be curved relative to a central axis of the ball 204. This second embodiment provides a different appearance, feel and bounce profile.

Figure 6:
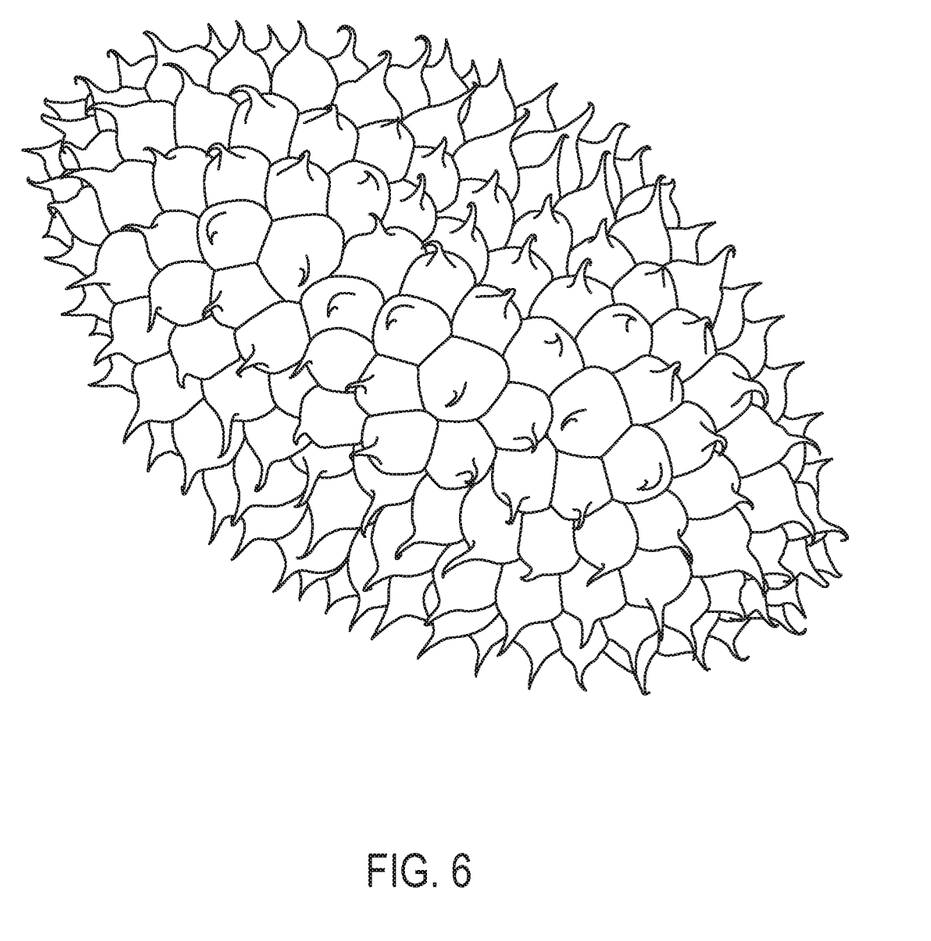
FIG. 6 shows a third embodiment of the ball with tactile outer layer according to the present invention.

FIG. 6 shows a third embodiment of the spiked ball 300 with a shape like an American football. The base of each spike overlaps with every other, however, once again, the spikes may be a discrete distance from each other on the pressurized ball 304. The third embodiment is just another example of potential outer shapes which are essentially unlimited.

The manufacturing technique to make the spiked ball can incorporate an automatic or semi-automatic process that applies silicon spikes to the round ball. A "drop" process may be used to produce the spiked ball. In the drop process, a highly viscous elastomer globule is deposited onto the outer surface. The high viscosity globule creates the tail-shaped appearance as it leaves a dispensing device and is deposited onto the ball. The ball is then continuously rotated to deposit each of the spikes in continuous rows or layers as desired.

In addition to a unique tactile surface the spikes allow for a unique visual appearance. Unique patterns can be created using a pixel approach to design. For example, the ball can have stripes, X patterns or triangles. With computer assistance, the spikes may appear as faces, words or other designs may be created.

The ball can be of any size based on the size of the inner ball. Smaller balls may have a solid inner core, but hollow cores are preferred with balls greater than 2 inches in diameter. Otherwise, the additional weight could cause a potentially dangerous impact with a person or could cause damage to another object.

Figure 7:
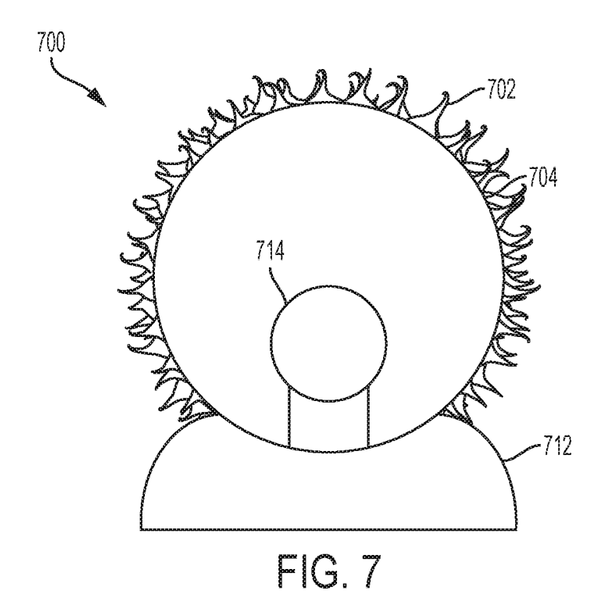
FIG. 7 shows a cross-sectional view of a fourth embodiment of a spiked globe used as a lamp.

FIG. 7, the spiked design can be used for a lamp 700, such as, for example, a night light. The lamp 700 includes a base 712, a globe 704 covered with spikes 702, and a light source 714 inside the globe. The light source may be incandescent, LED or other types of illumination. For a night light application, typically the light source 714 would be low wattage.

Figure 8:
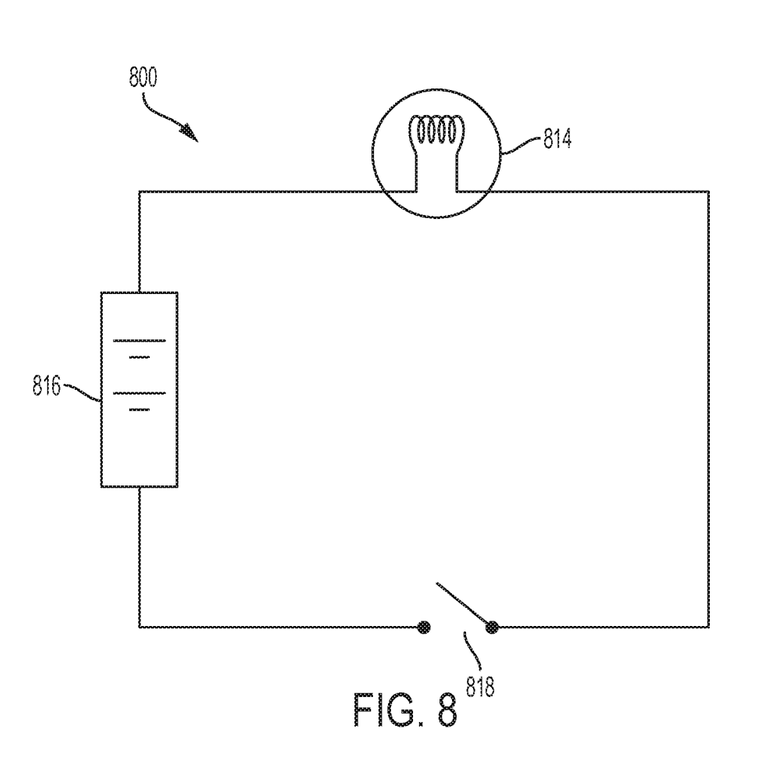
FIG. 8 shows a lighting circuit for the lamp shown in FIG. 7.

FIG. 8 shows an illumination or electrical lighting circuit 800 for the lamp 700. The circuit 800 includes a battery 816 connected to the light source 814 by a switch. The circuit 800 uses a battery 816, however, other sources of power may be used such as a plug into 112 volt alternating current house power with a voltage reduction transformer and a rectifier circuit.

The electrical (illumination) circuit may be in the base 712 of the lamp. In another embodiment, an electrical power circuit is enclosed within an inflated ball with a tactile outer layer. The power circuit can have a motion sensor such that the light source is only illuminated when the ball receives an impact or is otherwise moved or in motion. The ball may also have a solar photovoltaic cell and battery so that it can be illuminated without external charge. In these embodiments, the circuitry can be made extremely durable so that the ball can be bounced or thrown without damage.

Figure 9:
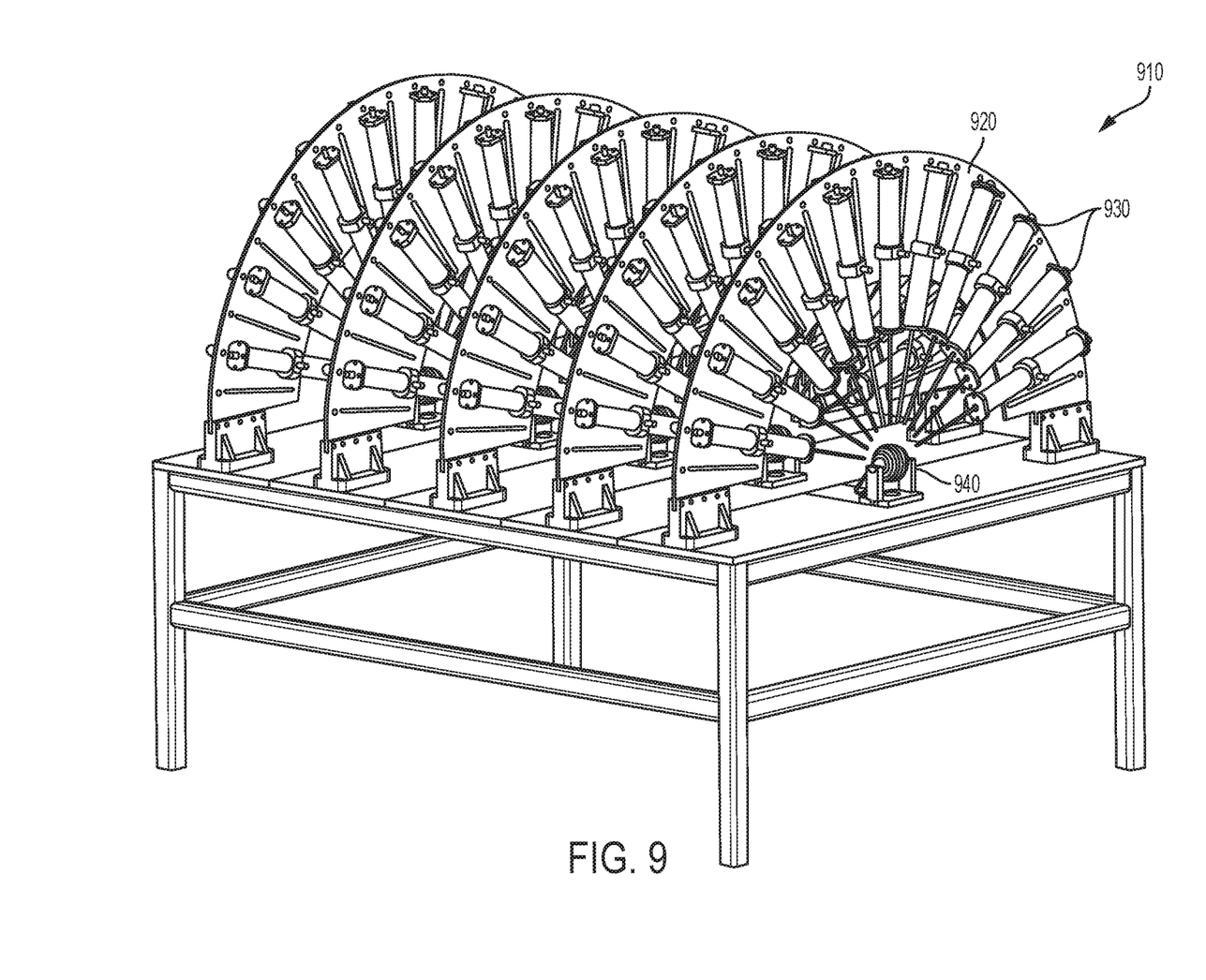
FIG. 9 illustrates a multi ball production rig to produce objects with tactile outer layers.

FIG. 9 illustrates a multi ball production rig 910 to produce balls with tactile outer layers. The production rig 910 includes a set 920 of armature injection arms 930 that are mounted in an arc around a mounting device 940. The object, such as, for example, a ball made from, for example, a foam or solid core or an inflatable ball are mounted in the mounting device 941.

Each of the injection arms 930 has an applicator tip that deposits elastomer globules onto the ball. The ball can then be rotated to deposit additional globules until the surface of the ball is covered.

Figure 10:
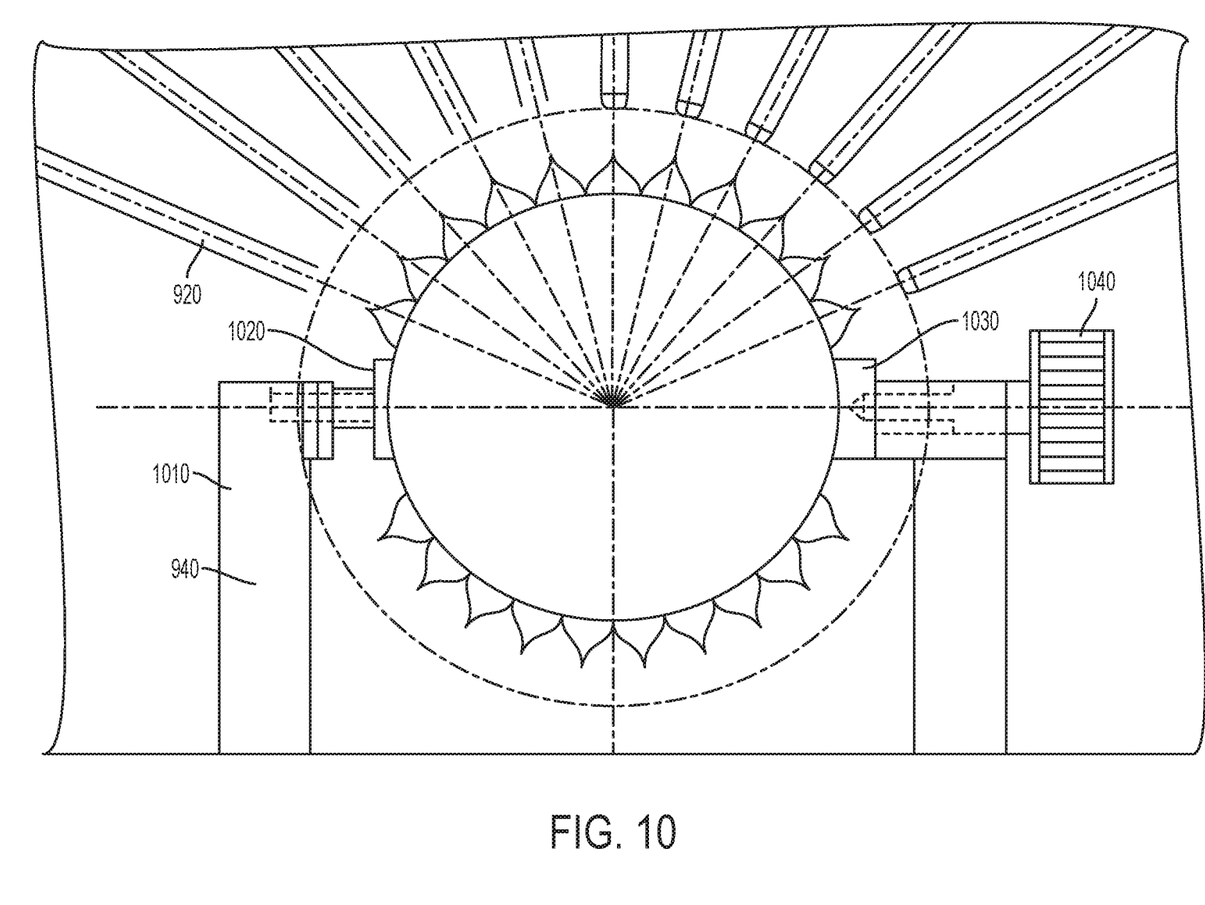
FIG. 10 illustrates a cross sectional view of injection arms and mounting device to produce an object with a tactile outer layer.

FIG. 10 is a cross-sectional view of the mounting device 940 and applicator tips of the set of injection arms 930. The mounting device 940 includes a bracket with first and second adjustment arms 1020, 1030. The adjustment arms 1020, 1030 are positioned to hold an object between them. The adjustment arms 1020, 1030 can be rotated around a central axis. When the object is a ball, the adjustment arms are positioned so that the ball can be rotated on the central axis. The rotation can be achieved manually with an adjustment device 1040 that can be a knob to rotate manually or a gear to rotate the ball with a motor.

The applicator tips deposit elastomer globules onto the object positioned between the adjustment arms. The applicator tips move closer to the ball (proximate position) to deposit the globules. The applicator tips then withdraw (distal position) which creates a tail-like shape at the end of the globule farther from the surface of the ball.

Figure 11:
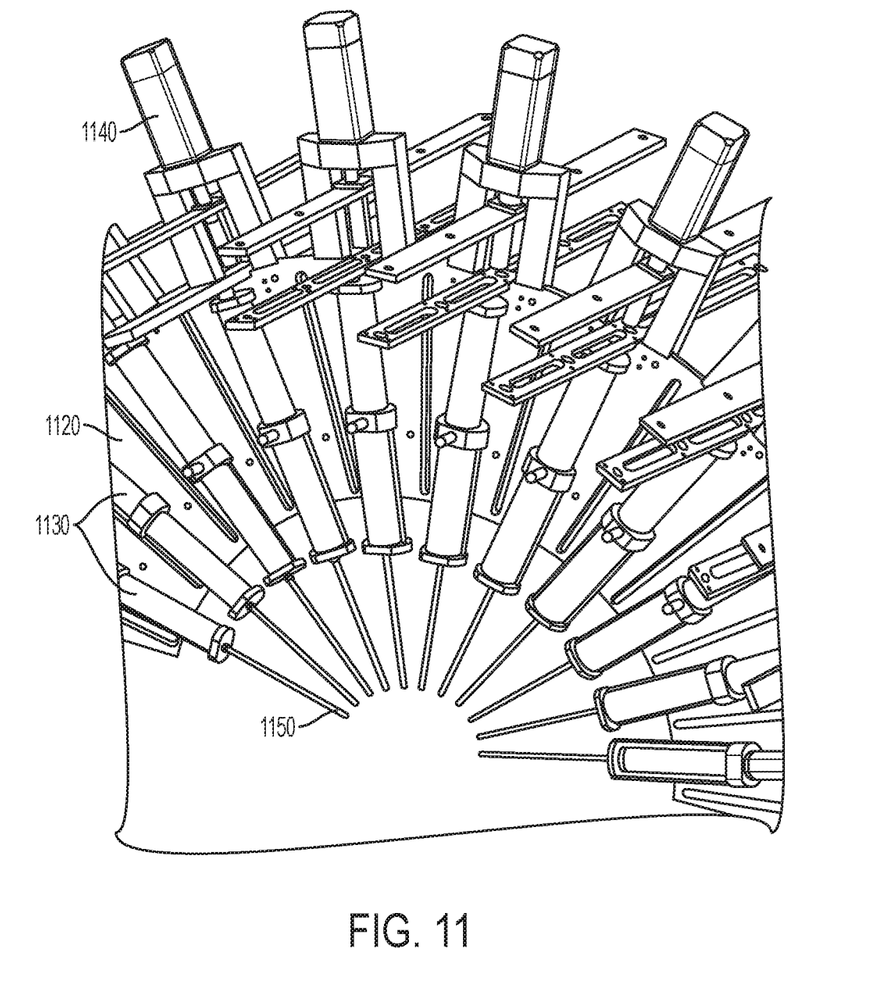
FIG. 11 illustrates a partial view of injection arms to produce an object with a tactile outer layer.

FIG. 11 is a partial view of an injection system 1120 to produce an object with a tactile outer layer. The injection arms 1130 are arranged in a radial array. The injection arms 1130 are mechanically moveable by an injection arm drive system 1140. Each drive system 1140 moves the injection arm on a shaft.

Figure 12:
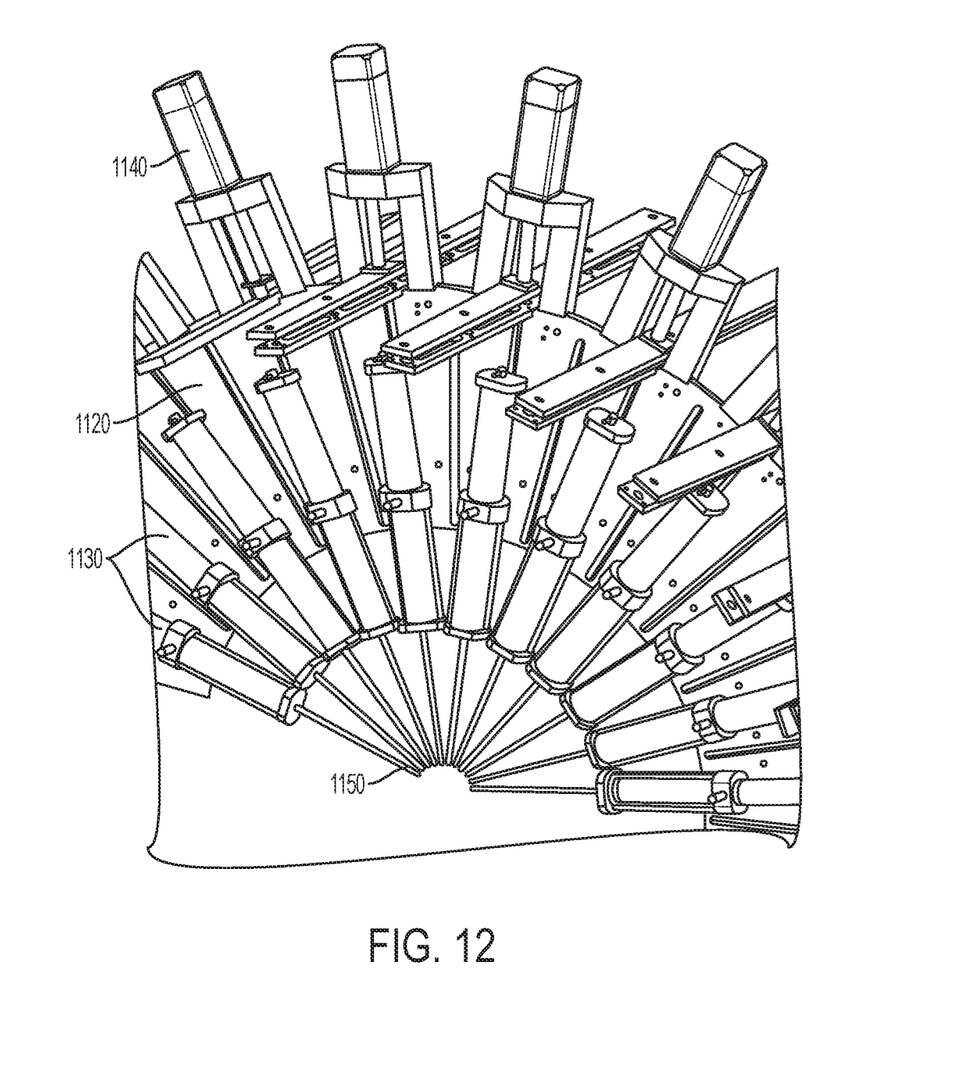
FIG. 12 illustrates another partial view of injection arms to produce an object with a tactile outer layer.

FIG. 12 is a second partial view of the injection system 1120. In FIG. 11, the applicator tips or nozzles 1150 of the injection arms are in a distal position and in FIG. 12 the tips 1150 are in a proximate position, with distal being a position farthest from the object that would be positioned in the center and proximate being a position closest to the object (not shown). Alternatively, an injection mold that produces the inner ball is positioned centrally relative to the injection arms 1130 and the globules are applied to the molded ball.

When the tips 1150 are in the proximate position, pressure causes elastomer globules to be deposited onto an object (not shown). As the tips 1150 are withdrawn to the distal position, a tail-like shape is created from the elastomer material furthest from the surface of the object.

Figure 13:
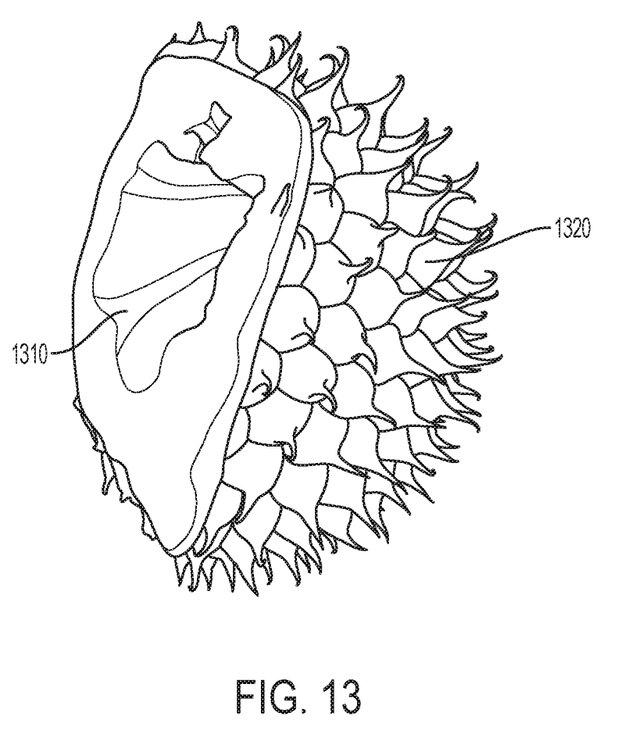
FIG. 13 shows another embodiment of an object with a tactile outer layer and a foam core.

FIG. 13 illustrates a ball with tactile outer layer form around a foam core. Open cell or closed cell foam may be used. In other embodiments, the solid core is high density material which may be a synthetic rubber, such as, for example, polybutadiene.

Numerous characteristics and advantages of the present invention have been set forth in the foregoing description, together with details of the structure and function of the invention. However, the disclosure is illustrative only, and changes may be made in details, especially in matters of shape, size, and arrangement or addition of materials that are understood to be within the scope of the invention.

The invention claimed is:

1. A lamp globe with a tactile surface, comprising:
   a relatively smooth surface; and
   a series of protrusions on the outer surface;
   wherein the series of protrusions comprise a tear-dropped shaped mass that includes a base having a relatively flat bottom adhered to the outer surface and a narrow tip extending away from the outer surface.

2. The lamp globe of claim 1, wherein each tear-dropped shaped mass comprises an elastomer deposited on the outer surface.

3. The lamp globe of claim 1, wherein the series of protrusions comprises a layer of spikes covering the outer surface.

4. The lamp globe of claim 1, further comprising an illumination circuit in the lamp globe.

5. The lamp globe of claim 1, wherein the base of each tear-dropped shaped mass contacts the base of each adjacent tear-dropped shaped mass thereby completely covering the outer surface of the lamp globe.

6. A lamp; comprising:
   a base;
   a globe or portion of a globe with at least a portion of a surface covered with elastomer globules and supported by the base;
   a light source inside the globe; and
   an illumination circuit to power the light source.

7. The lamp of claim 6, further comprising a motion sensor disposed on the base, the motion sensor being configured to actuate the light source.

8. The lamp of claim 6, wherein the elastomer globules comprise a series of protrusions each having a tear-dropped shaped mass that includes a base with a relatively flat bottom adhered to an outer surface of the globe and a narrow tip extending away from the outer surface.

9. The lamp of claim 6, wherein the elastomer globules comprise a plurality of protrusions, each protrusion comprising a generally teardrop shaved mass deposited on the outer surface as a liquid elastomer globule, each generally teardrop shaped mass including a base in contact with the surface, and each generally teardrop shaped mass deposited on the surface partly, overlapping with the base of each adjacent teardrop shaped mass to form a substantially continuous layer on at least the portion of the surface of the inner ball.

\* \* \* \* \*